United States Patent [19]

Meisenheimer, Jr.

[11] Patent Number: 5,186,202

[45] Date of Patent: * Feb. 16, 1993

[54] TRIGGER MEANS FOR SELF-CLOSING BREAKAWAY VALVE ASSEMBLIES

[76] Inventor: Daniel T. Meisenheimer, Jr., 404 Longmeadow Rd., Orange, Conn. 06477

[*] Notice: The portion of the term of this patent subsequent to Mar. 16, 2008 has been disclaimed.

[21] Appl. No.: 373,178

[22] Filed: Jun. 28, 1989

[51] Int. Cl.⁵ ............................................. F16L 29/00
[52] U.S. Cl. ............................... 137/68.1; 137/614.02
[58] Field of Search .................. 137/68.1, 614.02, 797

[56] References Cited

U.S. PATENT DOCUMENTS 3,921,656 11/1975 Meisenheimer, Jr. et al. ....................... 137/614.02
4,295,484 10/1981 Meisenheimer, Jr. ............. 137/68.1
4,763,683 8/1988 Carmack ............................ 137/68.1

Primary Examiner—John C. Fox
Attorney, Agent, or Firm—Parmelee, Bollinger & Bramblett

[57] ABSTRACT

A self-closing breakaway valve assembly comprises first and second frangibly connected valve housings each having a rotatable valve member therein. The valve members are spring biased to close and are held open by trigger means. The trigger means comprises a first spider member spanning the bore of one valve member, the spider member having a truncated surface from which a trigger knob protrudes. A second spider member spans the bore of the other valve member, and defines a socket receiving the trigger knob in interengaging relationship to hold the valve members open. Upon separation of the housings, the trigger means disengages permitting the valve members to close.

17 Claims, 2 Drawing Sheets

TRIGGER MEANS FOR SELF-CLOSING BREAKAWAY VALVE ASSEMBLIES

FIELD OF INVENTION

The invention herein relates to an improved trigger means for self-closing breakaway valve assemblies, wherein the trigger means maintains two rotatable valve members aligned in open position and releases the valve members to close upon any separation thereof.

BACKGROUND OF INVENTION

My U.S. Pat. No. 3,921,656 discloses self-closing breakaway valve assemblies of the type comprising two valve housings joined by a frangible connecting means, each valve housing having mounted therein a rotatable valve member which is spring-biased to close. Trigger means in the form of spider members spanning bores of the rotatable valve members and a trigger ball captured between the spider members maintains the rotatable valve members in their open position, with flow through aligned bores, until separation of the housings. Upon separation of the housings, the trigger ball providing engagement between the spider members is released, and the rotatable valve members rotate to their closed position.

Self-closing breakaway valve assemblies are installed in the fuel lines of aircraft or other vehicles in positions where the fuel line is vulnerable to being severed in a crash. Absent a self-closing breakaway valve assembly, a severed fuel line would permit fuel contained within the fuel line and the fuel tanks connected thereto to escape and cause or contribute to a fire.

A major advantage in this self-closing breakaway valve assembly is the central location of the trigger ball, wherein valve closure is initiated evenly without any dependence upon the particular location of housing separation.

A first concern with the self-closing breakaway valve assemblies generally described above is that the trigger ball could become lodged with one of the spider members, such as by corrosion or the like. This problem was addressed in my U.S. Pat. No. 4,295,484, in which bevelled surfaces are provided to "kick-out" the trigger ball in the event it is carried by one of the spider members when the valve members are rotating to the closed position. This "kick-out" provision is sufficient unless the ball is securely affixed to the spider member, but has the disadvantage of requiring extra structure, space and complexity.

A second concern with the loose trigger ball is the possibility that it could become wedged in either the self-closing breakaway valve assembly or in any other mechanisms employed in the safe vicinity. A third concern with the loose trigger ball is the additional difficulty it presents in assemblying the self-closing breakaway valve assemblies, in that the free trigger ball may become dislodged before proper engagement of the spider members is achieved.

SUMMARY OF THE INVENTION

Accordingly, a principal object of the invention herein is to provide an improved trigger means for self-closing breakaway valve assemblies.

An additional object of the invention herein is to provide an improved trigger mechanism releasing no loose elements upon separation and closing of the valve members.

A further object of the invention herein is to provide an improved trigger mechanism of the foregoing character which does not require modification of other structural aspects of self-closing breakaway valve assemblies.

The invention herein is directed toward an improved trigger mechanism for holding two rotatable valve members of a self-closing breakaway valve assembly in their open positions. The two rotatable valve members are respectively mounted in two housings, which are frangibly connected together, and the value members are spring biased to close. The rotatable valve members include bores formed therethrough and curved spider members spanning their bores, respectively. One of the spider members includes an integral trigger knob extending radially outwardly from a truncated trigger base portion of the curved spider member, wherein the trigger knob does not extend beyond the envelope of curvature established by the rotatable valve member. The other spider member defines a receptor socket in which the trigger knob of the first spider member is received to establish an interengaging relationship between the spider members, thereby holding the rotatable valve members in their open positions.

In the preferred embodiment, the trigger knob is provided as a short cylindrical projection having a hemispherical distal end, and the depth of the receptor socket is less than one half ($\frac{1}{2}$) the height of the trigger knob, so that the engagement between the first and second spider members is achieved totally by the trigger knob and socket. Also according to the preferred form of the invention, the spider members are recessed sufficiently from an envelope of curvature established by the rotatable valve members to assure clearance and ready closure of the rotatable valve members and prevent damage to seals, in the event of separation of the housing.

Also according to the invention herein, the trigger mechanism may be employed in a self-closing breakaway valve assembly comprising a single rotatable valve member in a first housing joined with an additional housing having a bore formed therethrough, with one of the spider members spanning the bore of the housing member that lacks a rotatable valve member.

The foregoing and other features and objects of the invention herein will in part be recognized by those skilled in the art and will in part appear from a perusal of the following description of the preferred embodiment and the claims, taken together with the drawings.

DRAWINGS

The same reference numerals refer to the same elements throughout the various Figures.

DESCRIPTION OF PREFERRED EMBODIMENT

Figure 1:
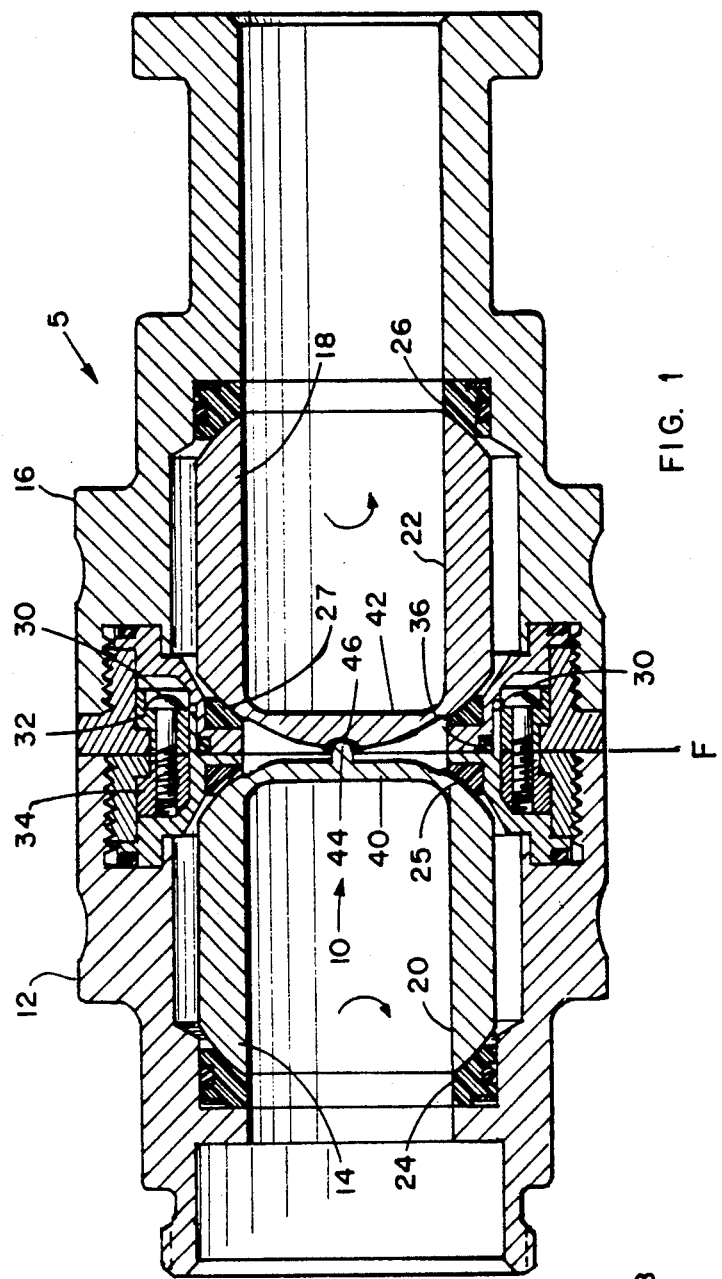
FIG. 1 is a longitudinal sectional schematic view of a self-closing breakaway valve assembly including two rotatable valve members held in their open positions by trigger means according to the invention herein.

With reference to FIG. 1, there is shown a self-closing breakaway valve assembly 5 having a trigger mechanism, generally indicated at 10, according to the invention herein. The self-closing breakaway valve assembly 5 is similar to the one described in my U.S. Pat. No. 3,921,656, incorporated herein by reference. Accordingly, the self-closing breakaway valve assembly 10 generally comprises a first housing 12 having a first rotatable valve member 14 mounted therein, and a second housing 16 having a second rotatable valve member 18 mounted therein. The rotatable valve members are generally spherical, with cutaway portions to accomodate mounting shafts, bias springs, etc. The rotatable valve members 14 and 18 define bores 20 and 22, respectively, and are held open by trigger means according to the invention herein generally designated at 10, which will be more fully discussed below. The housings also define bores such that when the rotatable valve members are in the open position shown in FIG. 1, a flow of liquid is permitted through the aligned bores 20 and 22 of the rotatable valve members 14 and 18 and thereby the entire valve assembly 5.

The rotatable valve members are spring-biased to close, and upon separation of the housings 12 and 16, the trigger mechanism 10 permits the rotatable valve members to close, i.e., to rotate to misalign the bores 20 and 22 and thereby block the passages through the housings 14 and 18. The directions of rotation to the closed positions are indicated by arrows in FIG. 1. An annular ball seat 24 is mounted behind the rotatable valve member 14 and incorporates a seal acting against the rotatable valve member 14. A second annular ball seal 25 is mounted on the other side of the rotatable valve member 14, surrounding the bore opening. It will be appreciated that the bore openings move over the seals as the valve closes. Another ball seat 26 is mounted in the other housing 16 and is also provided with a seal acting against the rotatable valve member 18, and a second annular seal 27 is also provided. Thus, when the valve members are closed, no liquid can escape from the valve housings.

The housings 12 and 16 are frangibly connected together by rivets 30 connecting rings 32 and 34 captured in the housings 12, 16 respectively. A line of frangibility F is indicated in FIG. 1, where the housings separate, and 0-ring seal 36 seals the joint between the housings. It will be appreciated that this means of frangible connection of the housings 12 and 14 is shown for purposes of illustration, and other frangible connections may be utilized, such as the frangible connector shown in my U.S. Pat. Nos. 4,232,697, and 4,301,823, incorporated herein by reference. It will further be appreciated that the rotatable valve members 14 and 18 are spring-biased to close by mechanisms such as shown and described in my other U.S. Patents referred to above.

Figure 2:
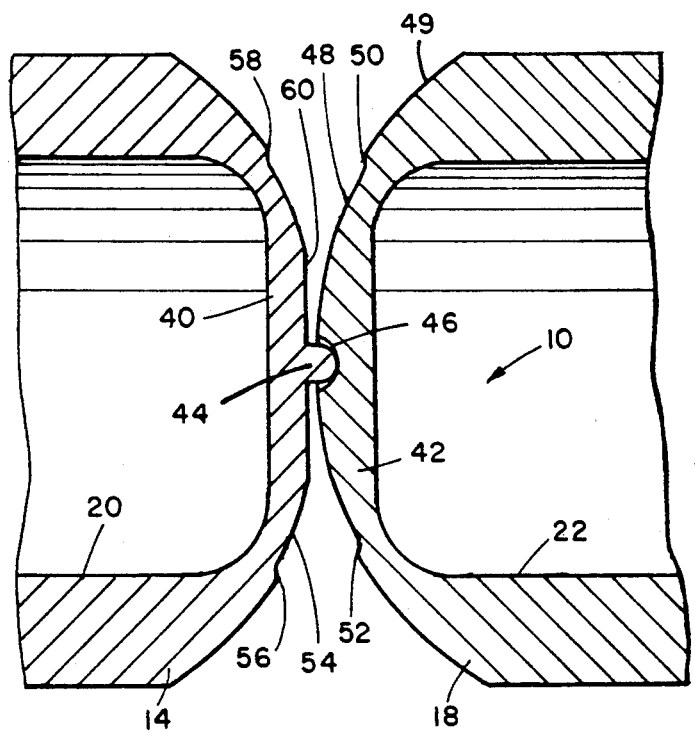
FIG. 2 is an enlarged fragmentary view of the rotatable valve members of FIG. 1, showing the interengagement established by the trigger means.

The trigger means 10 generally comprises a first spider member 40 spanning the bore 20 of rotatable valve member 14, a second spider member 42 spanning the bore 22 of the rotatable valve member 18, and the trigger means is characterized by a trigger knob 44 integrally formed on spider member 40 and interengagingly received in socket 46 formed in the other spider member 42. Referring now to FIG. 2, which is an enlarged fragmentary sectional view of the rotatable valve members and trigger means, spider member 42 has an curved outer surface 48, in which the socket 46 is defined. The curved surface 48 generally follows the envelope of curvature of the rotatable valve member 18 as established by its spherical outer surface 49, but is incrementally recessed therefrom, with the recess transition regions being indicated at 50 and 52. This incremental recess of the spider member assures smooth closure of the rotatable valve member with respect to its housing, and particularly as it passes over seal 27. The spider member 40 also has a curved outer surface 54 adjacent recess transitions 56 and 58; however, the central portion of spider member 40 is truncated to provide a trigger base 60.

Figure 3:
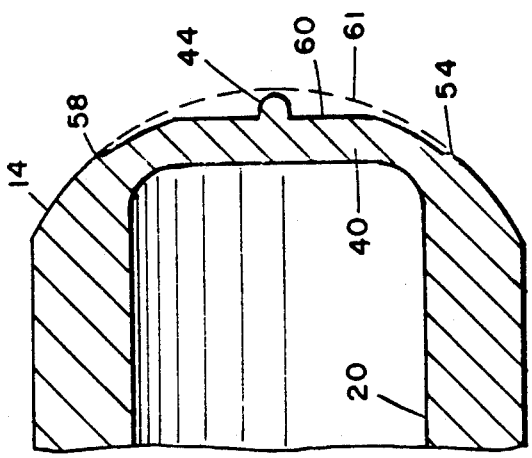
FIG. 3 is a fragmentary view of the one of the rotatable valve members of FIG. 2 having a trigger knob.

The trigger knob 44 extends radially outwardly from the truncated trigger base 60, with the distal end of the trigger knob 44 within the envelope of curvature established by the outer surface of valve member 14. This is illustrated in FIG. 3, where the envelope of curvature is indicated by dotted line 61, with the spider member and trigger knob incrementally recessed therefrom. Thus, the spider member 40 also permits smooth closure of the rotatable member 14, despite the outwardly protruding trigger knob 44.

Figure 5:
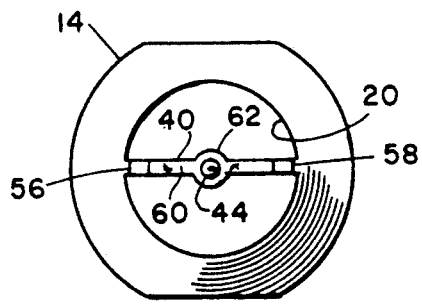
FIG. 5 is an elevation view of a spider member and trigger knob of one of the rotatable valve members.

The trigger knob 44 is preferably cylindrical when viewed in end on elevation, as is shown in FIG. 5, and the distal end of the trigger knob 44 is somewhat rounded and may be hemispherical. The socket 46 defined in spider member 42 is also preferably hemispherical and has a slightly larger radius than the trigger knob for a ready fit and accomodation, but has a depth of approximately one half ($\frac{1}{2}$) or less of the height of the trigger knob 44. Thus, when the trigger knob 44 is engaged in the socket 46, the spider members do not otherwise touch.

Figure 4:
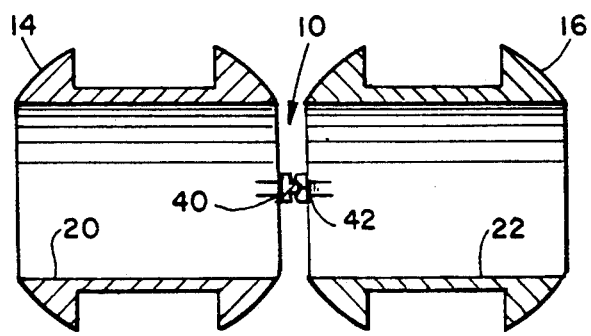
FIG. 4 is another fragmentary view of the rotatable valve members of FIG. 1, showing the interengagement established by the trigger means, taken along the lines 3—3 of FIG. 1.
Figure 6:
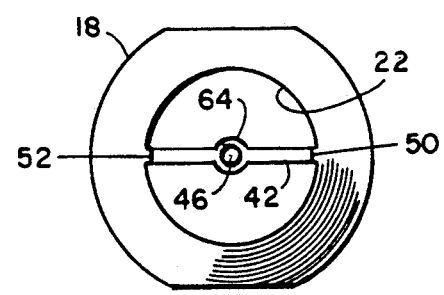
FIG. 6 is an elevation view of a spider member and receptor socket of the other rotatable valve member.

Referring now to FIG. 4 which shows the interengagement of the trigger means from a different angle, and to FIGS. 5 and 6, the spider members 40 and 42 are preferably quite thin and cause only minor disruption of flow through the self-closing breakaway valve assembly 5. The spider member 40 has a somewhat enlarged pad 62, from which the trigger knob 44 protrudes, and the spider member 42 also has a correspondingly enlarged central pad 64 defining the socket 46. These slightly enlarged portions which accomodate the trigger means, are aligned when the valve is open, and cause only minimum disruption of flow through the valve members.

It will be appreciated that the interengagement of the trigger knob and socket is centrally positioned in the bore paths through the self-closing breakaway valve assembly 5, and that separation of the housings initiated at an orientation about the flanges 32, 34 will cause the trigger knob and socket to disengage, permitting the rotatable valve members to rotate to their closed positions thus preserving the surface integrity of the seals during operation and unit assembly.

Since other changes and modifications varied to fit particular operating requirements and environments will be apparent to those skilled in the art, the invention is not considered limited to the embodiment chosen for purposes of illustration, and includes all changes and modifications which do not constitute a departure from the true spirit and scope of this invention as set forth in the following claims and equivalents thereto.

What is claimed is:

1. An improvement in self-closing breakaway valve assemblies of the type comprising:
   (A) a first valve housing having a first rotatable valve member rotatably mounted therein, said first valve housing and first rotatable valve member each having a bore formed therethrough, said bores being aligned when said first rotatable valve member is in an open position to provide a passage through said first valve housing, and said first rotatable valve member spring biased to rotate to a closed position wherein the bores of said first rotatable valve member and said first valve housing are misaligned to block the passage through said first valve housing;
   (B) a second valve housing having a second rotatable valve member rotatably mounted therein, said second valve housing and second rotatable valve member each having a bore formed therethrough, said bores being aligned when said second rotatable valve member is in an open position to provide a passage through said second valve housing, and said second rotatable valve member spring biased to rotate to a closed position wherein the bores of said second rotatable valve member and said second valve housing are misaligned to block the passage through said second valve housing;
   (C) frangible means connecting said first valve housing and second housing with the bores formed therethrough in alignment,
   wherein the improvement comprises trigger means holding the first rotatable valve member in its open position and releasing the first rotatable valve member upon separation of the first valve housing and second housing to permit the first rotatable valve member to rotate to its closed position, the trigger means comprising:
   (1) a first spider member spanning the bore of the first rotatable valve member, the first spider member being curved to generally conform to and lie along the envelope of curvature of the first rotatable valve member, and having a centrally located, truncated trigger base;
   (2) a trigger knob extending outwardly from the trigger base and terminating at a distal end recessed from the envelope of curvature of the first rotatable valve member; and
   (3) a second spider member spanning the bore of the second rotatable valve member, the second spider member being curved to generally conform to and lie along the envelope of curvature of the second rotatable valve member, the second spider member defining a socket for receiving in releaseable interengagement the trigger knob of the first spider member;
   wherein separation of the first and second housings upon fracture of the frangible connecting means releases the engagement between the first and second spider members and permits the first rotatable valve member to rotate to its closed position.

2. An improvement in self-closing breakaway valve assemblies as defined in claim 1 wherein the first and second spider members are recessed from the envelope of curvature of the rotatable valve members.

3. An improvement in self-closing breakaway valve assemblies as defined in claim 2 wherein the socket accommodates only a portion of the trigger knob, whereby the only engagement between the first and second spider members is provided by the trigger knob and socket.

4. An improvement in self-closing breakaway valve assemblies as defined in claim 3 wherein the trigger knob is approximately twice as long as the depth of the socket.

5. An improvement in self-closing breakaway valve assemblies as defined in claim 4 wherein the trigger knob has a cylindrical base portion and a hemispherical distal end portion, and the socket has a mating concave hemispherical configuration.

6. An improvement in self-closing breakaway valve assemblies as defined in claim 5 wherein the socket has a larger radius than the hemispherical distal end of the trigger knob.

7. An improvement in self-closing breakaway valve assemblies a defined in claim 1 wherein the socket accommodates only a portion of the trigger knob, whereby the only engagement between the first and second spider members is provided by the trigger knob and socket.

8. An improvement in self-closing breakaway valve assemblies as defined in claim 7 wherein the trigger knob is approximately twice as long as the depth of the socket.

9. An improvement in self-closing breakaway valve assemblies as defined in claim 1 wherein the trigger knob has a cylindrical base portion and a hemispherical distal end portion, and the socket has a mating concave hemispherical configuration.

10. An improvement in self-closing breakaway valve assemblies of the type comprising:
    (A) a first valve housing having a first rotatable valve member rotatably mounted therein, said first valve housing and first rotatable valve member each having a bore formed therethrough, said bores being aligned when said first rotatable valve member is in an open position to provide a passage through said first valve housing, and said first rotatable valve member spring biased to rotate to a closed position wherein the bores of said first rotatable valve member and said first valve housing are misaligned to block the passage through said first valve housing;
    (B) a second valve housing having a second rotatable valve member rotatably mounted therein, said second valve housing and second rotatable valve member each having a bore formed therethrough, said bore being aligned when said second rotatable valve member is in an open position to provide a passage through said second valve housing, and said second rotatable valve member spring biased to rotate to a closed position wherein the bores of said second rotatable valve member and said second valve housing are misaligned to block the passage through said second valve housing;
    (C) frangible means connecting said first valve housing and second housing with the bores formed therethrough in alignment,
    wherein the improvement comprises trigger means holding the first rotatable valve member in its open position and releasing the first rotatable valve member upon separation of the first valve housing and second housing to permit the first rotatable valve member to rotate to its closed position, the trigger means comprising:
    (1) a first spider member spanning the bore of the first rotatable valve member, the first spider member being curved to generally conform to and lie recessed from the envelope of curvature of the first rotatable valve member, and having a centrally located:

integral trigger knob extending outwardly from the spider member and terminating at a distal end recessed from the envelope of curvature of the first rotatable valve member; and (2) a second spider member spanning the bore of the second rotatable valve member, the second spider member being curved to generally conform to and lie recessed from the envelope of curvature of the second rotatable valve member, the second spider member defining a socket for receiving in releasable interengagement the trigger knob of the first spider member;

wherein separation of the first and second housings upon fracture of the frangible connecting means releases the engagement between the first and second spider members and permits the first rotatable valve member to rotate to its closed position.

11. An improvement in self-closing breakaway valve assemblies as defined in claim 10 wherein the socket accommodates only a portion of the trigger knob, whereby the only engagement between the first and second spider members is provided by the trigger knob and socket.

12. An improvement in self-closing breakaway valve assemblies as defined in claim 11 wherein the trigger knob is approximately twice as long as the depth of the socket.

13. An improvement in self-closing breakaway valve assemblies as defined in claim 12 wherein the trigger knob has a cylindrical base portion and a hemispherical distal end portion, and the socket has a mating concave hemispherical configuration.

14. An improvement in self-closing breakaway valve assemblies as defined in claim 13 wherein the socket has a larger radius than the hemispherical distal end of the trigger knob.

15. An improvement in self-closing breakaway valve assemblies as defined in claim 10 wherein the socket accommodates only a portion of the trigger knob, whereby the only engagement between the first and second spider members is provided by the trigger knob and socket.

16. An improvement in self-closing breakaway valve assemblies as defined in claim 15 wherein the trigger knob is approximately twice as long as the depth of the socket.

17. An improvement in self-closing breakaway valve assemblies as defined in claim 10 wherein the trigger knob has a cylindrical base portion and a hemispherical distal end portion, and the socket has a mating concave hemispherical configuration.

* * * * *